F. MYERS.
COOKING UTENSILS.
No. 180,365. Patented July 25, 1876.
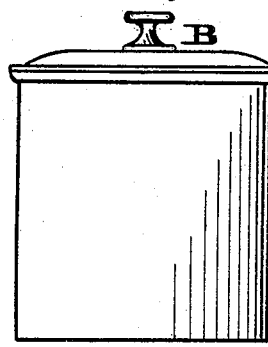
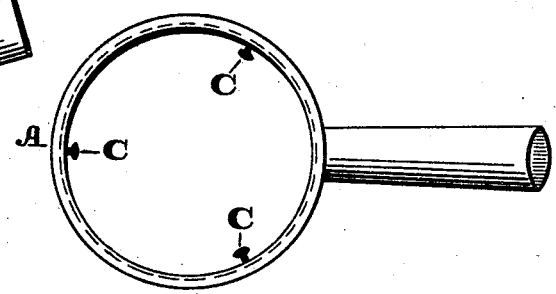
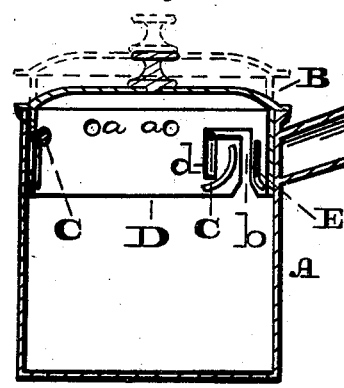
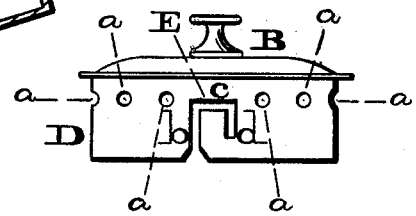
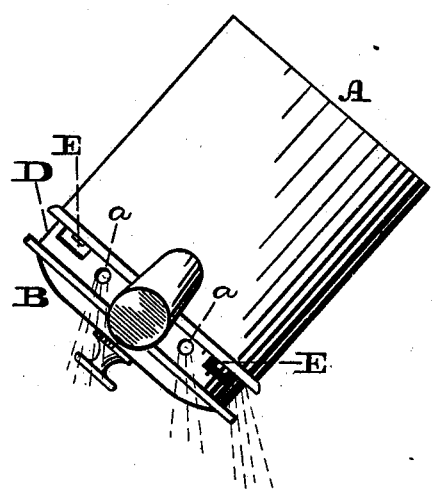
Witnesses:
Lewis F. Brous
A. P. Grant
Inventor:
Felix Myers
by John A. Diedersheim
Attorney.

UNITED STATES PATENT OFFICE.

FELIX MYERS, OF PHILADELPHIA, PENNSYLVANIA, ASSIGNOR OF ONE-HALF HIS RIGHT TO JOHN FORRESTEL, OF SAME PLACE.

IMPROVEMENT IN COOKING UTENSILS.

Specification forming part of Letters Patent No. 180,365, dated July 25, 1876; application filed July 12, 1876.

*To all whom it may concern:*

Be it known that I, FELIX MYERS, of the city and county of Philadelphia, and State of Pennsylvania, have invented a new and useful Improvement in Cooking Utensils; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a side elevation of the utensil embodying my invention. Fig. 2 is a top view of the body thereof. Fig. 3 is a central transverse vertical section thereof. Fig. 4 is a side elevation of the lid thereof. Fig. 5 is a side elevation, showing the utensil inverted.

Similar letters of reference indicate corresponding parts in the several figures.

My invention consists of a utensil whose lid is attached to the body by a locking connection which permits the lid to open to a limited extent, and prevents detachment from the body, whereby the utensil may be inverted for purposes of draining or straining without loss of the solid contents of the body, or necessity of holding the lid, and during the cooking operations the lid cannot be forced by the steam laterally from the body.

Referring to the drawings, A represents the body of the cooking utensil, and B the lid thereof. To the inside of the body A, near the upper end thereof, there are secured studs or pins C, which project horizontally therefrom, and their exposed ends are preferably formed blunt, or with knobs, so as to present no sharp points to the hand when introduced into the body A for various purposes. D represents the rim of the lid B, and in the same there are openings or perforations $a$, and slots or ways E, which, beginning at the bottom edge of the rim, extend upwardly, as at $b$, then laterally, as at $c$, and then down, as at $d$, thus forming a three-sided passage for the studs C, which correspond in number and location with the slots E.

The operation is as follows: The article to be cooked is placed in the body A and the lid fitted to the latter, so that the portions $b$ of the slots E will receive the studs C, and the lid is then forced down to full extent. Now rotate the lid so that the portions $c$ of the slots E will receive the studs C, which then act as a stop or limit of rotation of the lid. When the water or other fluid is to be drawn from the body A the utensil will be inverted, as shown in Fig. 3. The lid falls or it may be drawn out, and the portions $d$ of the slots E receive the studs C, thus serving to limit the extent of displacement of the lid and hold the latter in its displaced position. The perforations $a$ of the rim D are thus uncovered, and the fluid immediately flows therethrough, and it may also flow through the slots E; but the solid contents of the body cannot escape, as the lid holds them in the utensil, whereby they will be drained or strained without the necessity of removal from the body or holding the lid, as is customary.

It is evident that by rotating the lid in the proper direction and withdrawing it from the body, the interior of the latter will be readily accessible.

During the cooking operation the lid may rise, as usually, due to the pressure of the steam; but lateral displacement of the lid is prevented, this being another advantageous feature of the joint of the lid and body.

Having thus described my invention, what I claim as new, and desire to secure by Letters Patent, is—

1. The lid B, attached to the body A by a locking connection which permits the lid to open to a limited extent, and prevents detachment from the body, substantially as and for the purpose set forth.

2. The rim D, with slots E for engagement with studs C of the body A, substantially as and for the purpose set forth.

FELIX MYERS.

Witnesses:
JOHN A. WIEDERSHEIM,
H. E. HINDMARSH.